US009875182B1

(12) United States Patent
Wallace et al.

(10) Patent No.: US 9,875,182 B1
(45) Date of Patent: Jan. 23, 2018

(54) LOCK FREE CONTAINER PACKING

(71) Applicant: EMC Corporation, Hopkinton, MA (US)

(72) Inventors: Grant R. Wallace, Pennington, NJ (US); Philip N. Shilane, Yardley, PA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 170 days.

(21) Appl. No.: 14/721,587

(22) Filed: May 26, 2015

(51) Int. Cl.
G06F 12/00 (2006.01)
G06F 12/06 (2006.01)
G06F 13/16 (2006.01)
G06F 9/54 (2006.01)

(52) U.S. Cl.
CPC .......... *G06F 12/0623* (2013.01); *G06F 9/544* (2013.01); *G06F 13/1663* (2013.01); *G06F 2212/251* (2013.01)

(58) Field of Classification Search
None
See application file for complete search history.

(56) References Cited

U.S. PATENT DOCUMENTS

| 7,865,638 | B1* | 1/2011 | Wyatt | G06F 12/0284 710/52 |
|---|---|---|---|---|
| 2004/0025144 | A1* | 2/2004 | Yang | G06F 11/3612 717/128 |
| 2005/0066082 | A1* | 3/2005 | Forin | G06F 5/065 710/52 |
| 2006/0253649 | A1* | 11/2006 | Wezelenburg | G06F 9/3879 711/110 |
| 2011/0078249 | A1* | 3/2011 | Blocksome | G06F 9/544 709/206 |
| 2012/0331470 | A1* | 12/2012 | Jones | G06F 9/544 718/102 |
| 2013/0014118 | A1* | 1/2013 | Jones | G06F 9/52 718/104 |
| 2013/0091332 | A1* | 4/2013 | Vankov | G06F 9/544 711/153 |

* cited by examiner

*Primary Examiner* — Kaushikkumar Patel
(74) *Attorney, Agent, or Firm* — Workman Nydegger

(57) ABSTRACT

Systems and methods for writing data are provided. A lock-free container and methods of writing to the lock-free container are disclosed. The container is associated with a tail pointer that identifies free space in the container. Threads writing to the container access the tail pointer and update an offset in the tail pointer to account for a size of a write to the container. Multiple threads can write to the same container without having to contend for a container lock.

19 Claims, 3 Drawing Sheets

LOCK FREE CONTAINER PACKING

FIELD OF THE INVENTION

Embodiments of the invention relate to systems and methods for writing data. More particularly, embodiments of the invention relate to systems and methods for enabling multiple streams to write data into containers or other data structures.

BACKGROUND

Computing systems rely heavily on the data stored within their storage systems. For a variety of reasons, there is a need to ensure that the data is organized so that reading and writing operations can be more efficient. Some systems deal with this issue by packing data into larger units that are referred to as containers throughout this disclosure. Containers are examples of data structures used to organize and store data, where the data may or may not be related or sequential to one-another. After a container is filled, it is written as a unit to storage. A container has several advantages. For example, a container can reduce internal fragmentation and is more efficient when performing large write operations.

Ideally, segments or data from the same stream of data are packed together in the same container. This can be accomplished by associating each data stream with its own container. A data stream may be assigned to a file being written, assigned to a client system writing to the storage system, or assigned with other techniques. As the number of data streams in the computing system increases, this arrangement can become unmanageable and requires a prohibitive amount of memory because each stream would have a container assigned to it. For 1,000 streams, each with a 1 MB container, 1 GB of RAM would be allocated. In cases where some data streams write slowly into their assigned containers, unused space in containers is assigned, but effectively wasted.

Instead of allocating a container for each data stream, containers can be shared. Thus, segments from multiple streams are packed together in the same container. Sharing a container among multiple data streams avoids a situation of having an in-memory (e.g., in RAM) container per stream and avoids a problem of wasted space associated with streams that write slowly or infrequently to their own containers.

However, sharing a container between streams leads to additional concerns. For instance, some storage applications, such as data caching on solid-state drives (SSDs), can have a very high data stream count and a very high write churn. If each data stream is a thread of execution, there can be high contention to simultaneously pack data into the same container. In other words, several data streams may want to write into the same container at the same time. This can be handled by either queuing the requests so that a single packer thread writes to the container or by acquiring a container lock such that only one data stream has access to the container at a time.

The problem with queuing requests is that it involves extra copying of the data between memory locations and has a corresponding performance cost. The problem with acquiring a container write-lock is that it leads to execution threads waiting because of lock contention. Systems and methods are needed to improve write throughput for packing data in a storage system.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
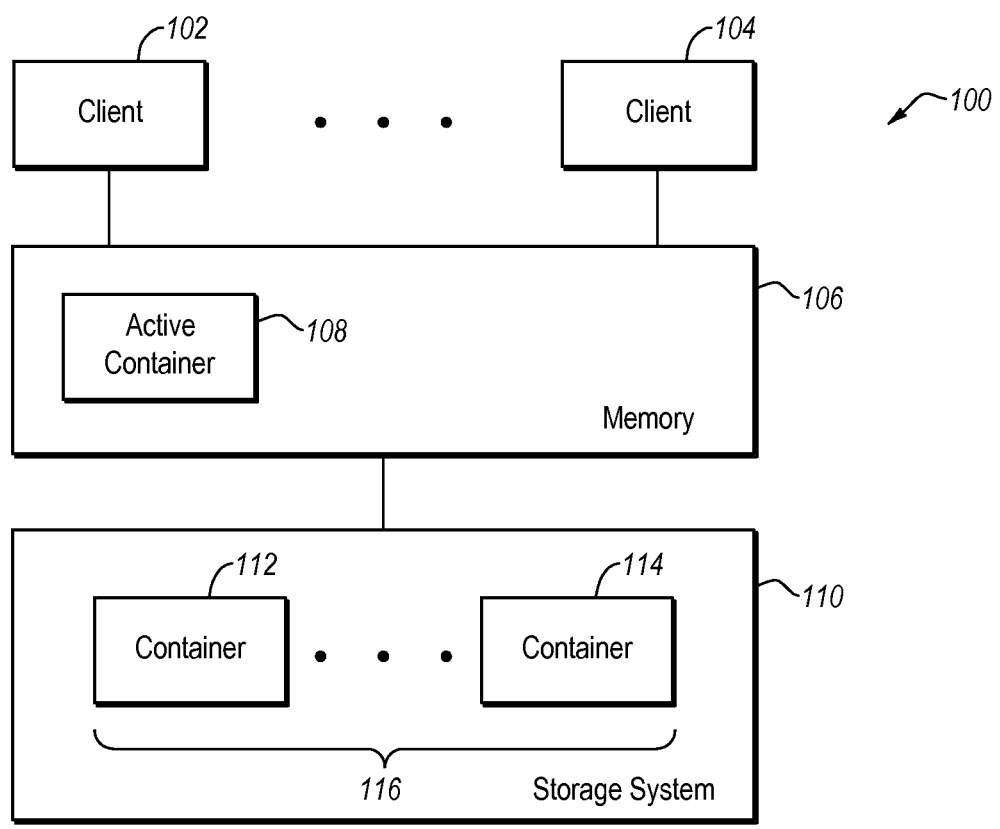
FIG. 1 is an example of a computing environment for implementing lock-free containers.

Embodiments of the invention generally relate to systems and methods for writing data to memory and to systems and methods for storing the data. More particularly, embodiments of the invention relate to systems and methods for packing data in a data structure such as a container. Embodiments of the invention allow multiple streams to write to a container at the same time while eliminating lock contention for writing to the container or other data structure. In addition, the need for a queue and a packing stream may also be eliminated.

As discussed herein, embodiments of the invention may store data in a container or write data to the container. A container is an example of a data structure in which data is packed. In addition, the size of the container may be fixed. In one example, a container may be configured to store one or more segments that are written to the container by different streams or clients. In one example, a segment may be a variable size block or chunk of data. A fixed-sized segment is also within the scope of embodiments of the invention. As an example, a segment or chunk of data may be 4 Kilobytes (KB) in size. By way of example, a container may be configured to store 1 Megabyte (MB) of data—thus the container size is 1 MB and 1000 containers can be accommodated in 1 GB of memory. When the container is full (or nearly full), another container may be used. In some examples, more than one container may be used at a time. More than one container may be present in memory and multiple streams may write to one or more containers. One of skill in the art can appreciate, with the benefit of the present disclosure that embodiments of the invention may apply to other memory or data structures that are associated with multiple streams that may write or read data. A thread in the storage system may handle the read and write activities for a stream.

More specifically, storage systems often pack multiple segments or blocks together into a single unit, such as a container, to achieve more efficient read and write throughput or to reduce fragmentation. For example, storage systems that have variable sized segments because of compression or deduplication algorithms or for other reasons may pack multiple segments of different sizes into a fixed sized container. Additionally writing large sequential containers composed of many segments to storage can be more efficient than writing many individual segments without the benefit of the container. In some examples, a container may be sized to match underlying storage system properties such as the flash erasure block size or RAID properties. In other words, once the in-memory container is full, the entire container can be written to storage more efficiently than if all of the segments packed therein were written to storage individually.

Embodiments of the invention allow multiple threads to pack or write concurrently into the same container. This is generally accomplished by determining the size of the write to be performed by a particular thread and then allocating an appropriate amount of space in the container to that thread. As more threads write to the container, each thread then writes to a different portion of the container.

To accomplish this, an atomic variable is maintained in one example and associated with the container. The atomic variable of the container may identify the offset within the container where the free space begins. In one example, the atomic variable is a container tail pointer that marks the beginning of the free space or the end of the allocated or used space.

When a thread wants to pack data into a container, the thread will add the size of data to be added to the container to the current tail offset value. An atomic compare-and-swap operation is then performed to swap the old tail pointer with the new tail pointer. If the operation succeeds, then the thread has ownership of that region of the container between the old tail pointer and the new tail pointer and the thread can write to that portion of the container concurrently while other threads write to other regions or portions of the container. Thus, the thread is allocated the space between the old tail pointer and the new tail pointer. In general, performing the compare-and-swap operation is faster than writing the data into the container.

More specifically, atomic variables can be used in conjunction with compare-and-swap operations. In a compare-and-swap operation the atomic variable can first be examined. Then, in one transaction, a comparison is done to the previously detected value and updated to a new value only if the atomic variable still has the previous value. If the previous value has changed then the compare-and-swap operation fails, i.e. because another thread has updated the atomic variable in the meantime. If the compare-and-swap operation fails, the thread may retry the operation by re-reading the atomic variable, recalculating a new value and trying the compare-and-swap operation again. Compare-and-swap operations may be supported by hardware such as CPUs or implemented in software such as an operating system.

After a thread has obtained a region in the container to write into, the thread atomically increments a segment-counter and retrieves a segment count (index) for its segment. The segment index can be used to insert meta-data about the segment into a header structure which will describe the packed container. The segment index (and thus header array index) may not correspond to the ordinal position of the packed data in the container (i.e. because ordering of operations is not guaranteed among multiple threads).

When the thread completes writing its data to the container the thread will atomically update a completion counter in one example. When the amount of free space in the container falls below a minimum segment size, or if a maximum time has elapsed since the last segment was packed (i.e. indicating that the free space is below the typical size of incoming segments), the container can be written to storage (e.g., moved from RAM or other cache to another storage or, more generally, moved from one memory to another memory). When writing the container to storage, the container can be added to a write queue by the thread that last checked the atomic variable that maintains the tail pointer. At this point, a write thread can do any remaining work to seal the container and write the container to the storage system. The write thread can validate that all data has been packed when the completion counter equals the segment counter.

Alternately, a union structure could be kept which would include both the tail-pointer position and the next ordinal location in the header array. The thread would update the union structure to both acquire the next ordinal position and update the tail-position. An atomic compare-and-swap operation would be done on that union to atomically get both a position in the header array and a data location. This would guarantee that the ordinal position of the data in the container and in the header agree in one example.

A container may include segment metadata in the container's header. Entries in the container metadata can identify the location of segment data or corresponding segments of data in the container. In later text we may refer to the container metadata as the "segment index" because it can map from a segment identifier to the segment's data location in the container.

FIG. 1 illustrates an example of a computing system 100. The system 100 includes clients, represented as clients 102 and 104 that are connected with a memory 106 and a storage system 110. The memory 106 can be part of the storage system 110, associated with the clients 102 and 104. The memory 106 may be a cache as well.

In one example, the memory 106 and/or the storage 110 are part of a server or of a server system. The memory 106 may represent RAM, flash memory, or other memory. Typically, the memory 106 is smaller than the larger storage system 110. In addition, the memory 106 may represent tiers of memory and/or tiers of cache levels. The memory 106 may be a solid state memory in one example. The storage system 110 may include multiple storage devices, such as hard disk drives (HDDs). Storage system 110 may be flash memory or other memory.

The clients 102 and 104 may be any device capable of accessing the storage system 110. Example clients include, but are not limited to, smartphones, tablet devices, desktop computers, virtual machines, server computers, or the like or combination thereof.

FIG. 1 illustrates that containers 116 are stored in the storage system 110. The containers 116 include multiple containers such as container 112 and container 114. The containers 116 are packed with data. The container 112 may include segments or data written by different threads or clients, for example.

The container 108 in the memory 106 is an example of an active container. The container 108 may be in the process of being packed. The clients 102 and 104, for example, may be running processes or applications associated with certain data. When the data is written, a write thread associated with these processes or applications or with these clients may be responsible for writing the data to the container 108. Multiple active containers may be present in the memory 106 and multiple threads may write to the containers. In some examples, a single thread may also write to multiple containers concurrently or sequentially.

Thus, the container 108 is configured such that multiple threads can write to the container 108 at the same time. In one example, threads writing to the container 108 do not need to wait for any other thread to finish writing data. The container 108 is an example of a lock free container that can be packed by or written to by multiple threads at the same time.

Figure 2:
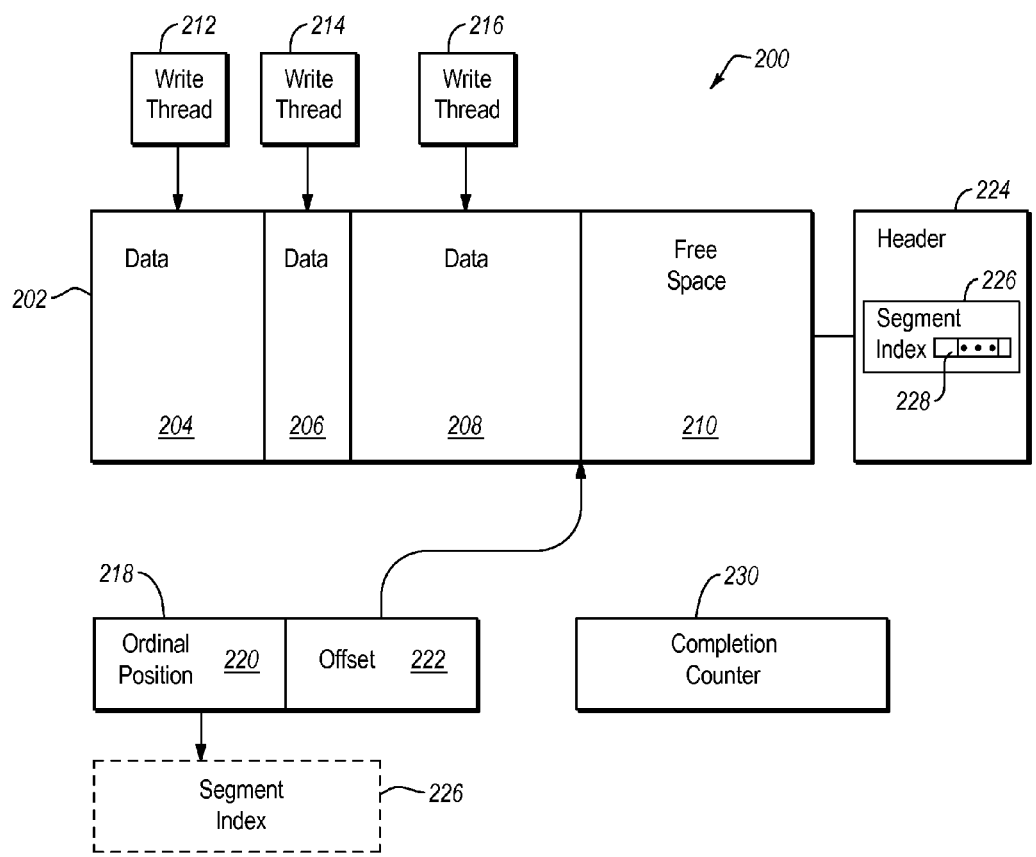
FIG. 2 illustrates an example of a container and of multiple streams that can write to the container simultaneously.

FIG. 2 illustrates an example of a lock-free container. FIG. 2 illustrates a container 202 that is partially packed with data. In FIG. 2, a write thread 212 is writing to or has written to a portion 204. Similarly, the write threads 214 and 216 are writing to or have written to the portions 206 and 208, respectively. The container 202 still has some free space 210 that is not yet packed with data. The free space 210 is not assigned or associated with a write thread. The segments in the portions 204, 206, and 208 may be of different sizes.

The container 202 may be associated with tail pointer 218 and a completion counter 230. Both the tail pointer 218 and the completion counter 230 may be atomic variables. An atomic variable (or an atomic operation) ensures, in one example, that the variable is isolated from concurrent processes. Atomic variable are updated in one transaction such that only one process or thread can change an atomic variable at a time.

With regard to the container 202, the tail pointer 218 identifies a location identified by offset 222 in the container 202 at which the free space 210 begins and only one thread is capable of making an adjustment to the tail pointer 218 at a time. As previously stated, if two threads attempt to change the tail pointer 218, only one of the threads will succeed. The other thread will likely fail and will have to attempt to access the tail pointer 218 at a later time. Stated differently, both threads may succeed in changing the tail pointer 218, but one of the threads may have to try more than once to change the tail pointer.

When a thread wants to add data to the container 210, the thread accesses the tail pointer 218 using, in one example, an atomic operation. Accessing the tail pointer 218 allows the thread to identify the location (offset 222) in the container 202 where the free space 210 begins. The thread adds the amount of data to be written to the tail pointer 218. The thread then does a compare-and-swap operation to update the tail pointer to its new value. If the compare-and-swap operation succeeds then the tail pointer 218 has been updated such that it points to another location in the container 202.

In effect, this operation allocates a portion of the container 202 to the thread that matches the amount of data to be written to the container 202 by the thread. This portion of the container 202 cannot be allocated to any other thread. After the compare-and-swap operation or update of the tail pointer 218 is completed, the tail pointer points to a new location in the container 202 that corresponds to the updated beginning of the free space 210 in the container 202. If the compare-and-swap operation fails, then the thread may retry by re-reading the tail-pointer, adding the amount of data to write to the tail-pointer and retrying the compare-and-swap operation.

The container 202 is associated with a header 224. The header 224 includes metadata about the container 202. The header 224 may include a segment index 226. Each entry in the segment index 226 corresponds to a segment or data stored in the container 202. For example, the entry 228 may correspond to the data 204. In one example, the entry 228 is the first entry in the segment index 226 and the data 204 is the first entry in the container 202. Other arrangements are within the scope of embodiments of the invention.

In one example, the tail pointer 218 includes an ordinal position 220 and an offset 222. The ordinal position 220 points into the segment index 226 and the offset 222 points to the boundary between a segment or data in the container 202 and the free space 210 in the container 202. Each thread that writes to the container updates the tail pointer as described herein. For example, the ordinal position 220 and the offset 222 may both be set to zero when a container is first opened or initialized. Assuming that the first thread to write to the container 202 is the write thread 212, the write thread 212 accesses the tail pointer 218 to determine the contents of the tail pointer 218 and to update the contents. In this example, the tail pointer 218 indicates that the next free ordinal position is position "0" and the next free data area is at offset 0. The thread 212 then updates the ordinal position 220 to the next free position of "1" and updates the offset to a value corresponding to the amount of data to be written by the write thread 212. The preceding updates are done in an atomic manner as previously described. The data written by the write thread 212 thus corresponds to the ordinal position "0".

The second write thread, for example the write thread 214, will attempt to obtain the ordinal position "1" and update the ordinal position 220 to "2" indicating the next free ordinal position. The ordinal positions in the tail pointer 218 also points to entries in the segment index 226. The ordinal position "0" may point, by way of example only, to entry 228 in the segment index. The entries in the segment index 226 may include other information about the corresponding segments such as a segment identifier (such as a block id, fingerprint, file and offset etc.), the container offset, length, time written, or the like.

If the write thread 214 is the next thread to write to the container 202, the write thread 214 accesses the tail pointer 218 and updates the ordinal position 220 and the offset. Because the write thread 212 has already written to the container 202 (or is in the process of writing to the container 202), the ordinal position 220 and offset 222 have values that reflect the next available free location and ordinal position for a segment to be written. The write thread 214 thus gets the ordinal position "1" (the second position) and changes the ordinal position 220 to "2" (indicating the next free ordinal location for the next thread) and updates the offset 222 to reflect the amount of data to be written by the thread 214 and thus indicating the next location data can be written by the next thread.

For example, if the write thread 212 will write 1 kilobyte (KB) of data, then it will update the offset 222 of tail pointer 218 to 1024. If the write thread 214 is also going to write 1 KB of data, then the offset 222 may be updated to 2048 by the write thread 214. In this manner, the offset 222 points to the beginning of the free space 210 in the container. The tail pointer 218 could be configured in other ways to identify a relationship between the entries in the container 202 and the write threads. The tail pointer 218 allows multiple threads to write to the container 202 at the same time.

The tail pointer 218 can be embodied in other forms. For example, the tail pointer 218 may only include an offset value into the container 202. Each write thread therefore only updates the offset value.

The container 202 may also be associated with a completion counter 230. The completion counter 230 may be used to determine when all threads writing to the container have finished writing. When the container 202 is full (even if some free space remains), the container 202 is closed and written to storage such as the storage system 110.

The completion counter 230 can be embodied in different forms. In one example, each of the write threads 212, 214 and 216 may increment the completion counter when they have completed writing to the container. When the completion counter 230 equals a maximum segment count for the container, then all writes to the container have completed. The last thread to write to the container 202 may have the responsibility to close the container and write the container to storage. Alternatively, a write thread may be tasked with closing the container and writing the container to storage when full or when no further writes are possible and when all writes are completed. No further writes are permitted, in one example, when the remaining free space is less than a predetermined value. Alternately, the last thread may simply determine that it is time to write the container to storage and add the container to a request queue for which requests for writing will be handled by a different thread. In this way the last client stream threads do not consume extra time writing the container to storage.

Figure 3:
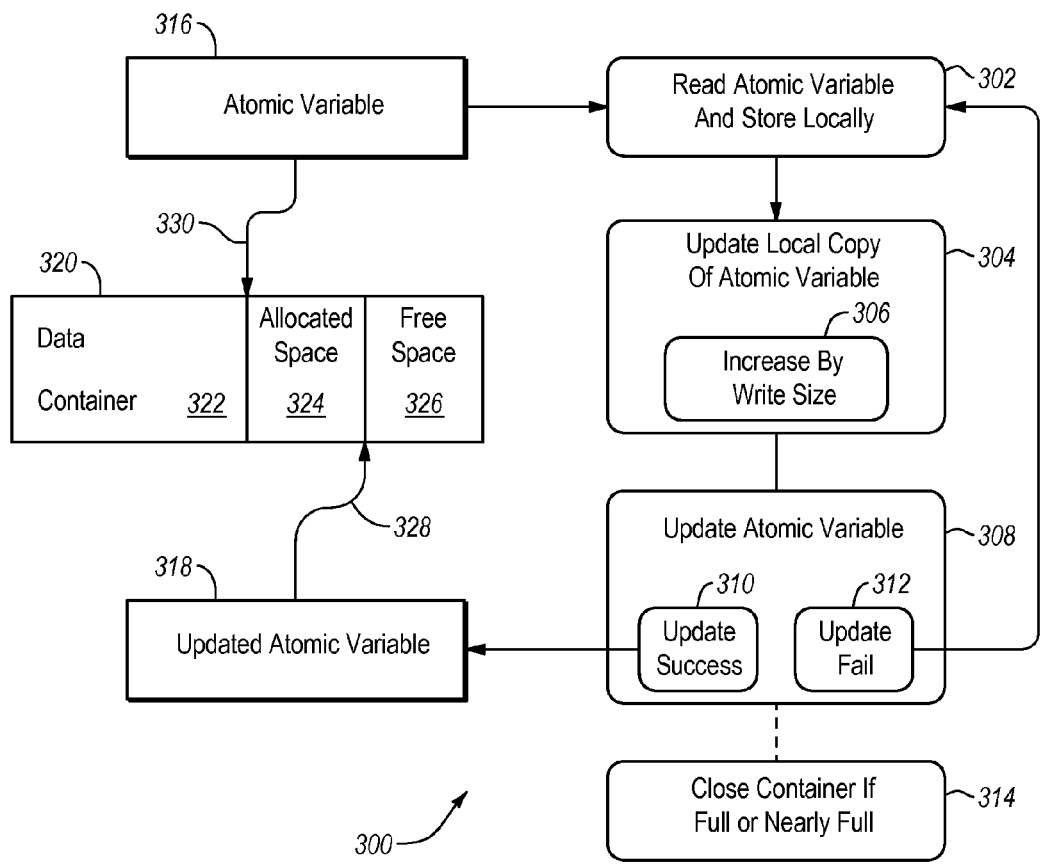
FIG. 3 is an example of a flow chart for packing a container.

One of skill in the art can appreciate that the container 202 may also have other metadata, such as the header 224 that describes various aspects of the container and that may describe various attributes or properties of the segments stored in the container as previously described FIG. 3 is a flow diagram illustrating an example of a method for writing to a container. In one example, the container has already been established in memory and is ready to receive data. In box 302, a write thread (or other process or client) may read the atomic variable 316, which is an example of a tail pointer. In one example, the atomic variable may also be stored locally for the write thread during the update process.

In box 304, the local copy of the atomic variable is updated. However, the original value may be retained for comparison purposes when the atomic variable is updated. To update the atomic variable, an offset included in the atomic variable may be increased by a write size in box 306. More specifically, the write thread is preparing to write a known amount of data to the container. The known amount or size is thus added to the offset included in the atomic variable 316.

In box 308, an attempt is performed to update the atomic variable using a compare and swap operation. A compare and swap operation is an atomic operation or instruction. The compare and swap operation compares the contents of a memory location (e.g., the atomic variable) with a given value (e.g., the local copy of the atomic variable). This attempt may result in an update success 310 or an update fail 312.

An update success 310 occurs if the compare is true. In this case, the atomic variable is updated with at least the new offset that was determined in box 304 and the atomic variable is modified. An update fail 312 occurs when the compare is false. If the comparison between the contents of a memory location (the atomic variable) and a given value (the local copy) is false, then the atomic variable is not updated. In one example, when the compare fails, another process may have updated the atomic variable.

An update fail 312, in one example, causes the process to retry to update the atomic variable by reading the atomic variable and storing its value locally in box 308. When an initial attempt to update the atomic variable fails, the process of updating the atomic variable can be repeated or retried for a given process until the atomic variable is successfully updated. If the attempts to update the atomic variable fail a certain number of times, the process may try to write to a different container or write to another location.

The compare and swap is performed as a single atomic operation to ensure that the atomic value is not updated by another thread in the meantime. An update success 310 results in the updated atomic variable 318. In other words, the updated atomic variable 318 is the result of modifying the atomic variable 316. Thus, the atomic variable 316 and the updated atomic variable 318 are the same variable and occupy the same memory space. FIG. 3 illustrates an example of how the atomic variable 316 changes as data is written to the container 320.

The result of updating the atomic variable is reflected in the container 320. A portion 322 of the container is full of data that has been previously written or that is in the process of being written. The previous value of the atomic variable 316 points to a location 330. The method 300 updates the atomic variable such that the updated atomic variable 318 points to a location 328. The location 328 identifies a beginning of free space 326 in the container 320. The allocated space 324 between the location 330 and the location 328 is allocated to the write thread (or client) that performed the method 300.

In box 314, the container 320 is closed if full or nearly full and written to a storage system. In this case, a completion counter may be used to insure that all threads writing to the container 320 have finished writing before closing the container and writing the container to storage. Also, a new container may be instantiated in memory if necessary.

The method 300 may be performed concurrently for multiple containers that are in-memory. Each container is associated with its own atomic variables in one example. The method 300 may be performed concurrently by multiple threads on the same container.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes a memory and a storage system, a method for writing to a container stored in the memory, the method comprising:
   accessing a tail pointer stored in the memory and associated with the container by a thread, wherein the tail pointer identifies a location in the container associated with free space;
   updating the tail pointer with a new tail pointer, wherein the tail pointer is configured to ensure that a portion of the container between the tail pointer and the new tail pointer is only allocated to the thread;
   writing data to the portion of the container by the thread; and
   maintaining an atomic completion counter to determine when all threads have completed writing to the container, wherein the container is written to the storage system even though the container may have free space, and wherein the atomic completion counter includes a single variable.

2. The method of claim 1, wherein the tail pointer includes an offset value and an ordinal value, wherein updating the tail pointer includes updating the ordinal value and updating the offset.

3. The method of claim 2, wherein updating the tail pointer includes updating the offset value based on a size of the data to be written to the portion of the container.

4. The method of claim 1, wherein accessing the tail pointer includes storing a copy of the tail pointer locally to the thread.

5. The method of claim 1, wherein updating the tail pointer comprises performing an atomic compare-and-swap operation on the tail pointer.

6. The method of claim 1, further comprising more than one thread writing to the container simultaneously.

7. The method of claim 1, further comprising re-reading the tail pointer when updating the tail pointer fails.

8. The method of claim 1, further comprising closing the container and writing the container to the storage system.

9. The method of claim 7, wherein the re-read tail pointer is used to determine a new tail pointer, further comprising re-trying to atomically update the tail pointer with the new tail pointer.

10. In a system that includes a memory and a storage system, a method for enabling multiple threads to write to a container present in the memory, the method comprising:
    storing a local copy of an atomic variable associated with a container, wherein the atomic variable identifies an offset value to free space in the container;
    updating the offset value of the local copy of the atomic variable with a size of data to be written to the container;
    updating the atomic variable with the updated offset value;
    writing the data to a portion of the container corresponding to a location between the offset value and the updated offset value; and
    maintaining an atomic completion counter to determine that the container is ready to be written to the storage system, wherein the container is written to the storage system even based on the completion count through the container may include free space, and wherein the atomic completion counter includes a single variable.

11. The method of claim 10, wherein the atomic variable includes the offset value and an ordinal position that points to an entry in a segment index of the container, further comprising updating the ordinal position for the data.

12. The method of claim 10, wherein updating the offset value of the local copy of the atomic variable includes adding the size of the data to be written to the offset value to obtain the updated offset value.

13. The method of claim 10, wherein updating the atomic variable with the updated offset value includes performing a compare-and-swap operation.

14. The method of claim 13, further comprising retrying to update the atomic variable when the compare-and-swap operation indicates failure.

15. The method of claim 14, further comprising, when the compare- and swap operation fails:
    storing a new local copy of the atomic variable;
    updating the offset value of the new local copy with the size of the data to be written; and
    retrying to update the atomic variable with a new updated offset value.

16. The method of claim 14, further comprising retrying to update the atomic variable until the compare-and-swap operation is successful.

17. The method of claim 10, further comprising closing the container and writing the container to the storage system.

18. The method of claim 17, further comprising maintaining the atomic completion counter to determine when all threads have completed writing to the container.

19. The method of claim 10, further comprising multiple threads writing to the container concurrently.

* * * * *